United States Patent
Yeo et al.

(10) Patent No.: US 9,955,126 B2
(45) Date of Patent: Apr. 24, 2018

(54) SYSTEMS AND METHODS OF ANALYZING MOVING OBJECTS

(71) Applicant: Rapsodo Pte. Ltd., Singapore (SG)

(72) Inventors: Kelvin Soon Keat Yeo, Singapore (SG); Batuhan Okur, Singapore (SG); Lodiya Radhakrishnan Vijayanand, Singapore (SG)

(73) Assignee: RAPSODO PTE. LTD., Singapore (SG)

(*) Notice: Subject to any disclaimer, the term of this patent is extended or adjusted under 35 U.S.C. 154(b) by 0 days.

(21) Appl. No.: 14/830,375

(22) Filed: Aug. 19, 2015

(65) Prior Publication Data

US 2017/0054950 A1 Feb. 23, 2017

(51) Int. Cl.
| | |
|---|---|
| G06K 9/00 | (2006.01) |
| H04N 7/18 | (2006.01) |
| G01S 13/86 | (2006.01) |
| G01S 13/58 | (2006.01) |
| G01S 13/88 | (2006.01) |

(52) U.S. Cl.
CPC ............. H04N 7/188 (2013.01); G01S 13/58 (2013.01); G01S 13/867 (2013.01); G01S 13/88 (2013.01)

(58) Field of Classification Search
CPC ................................ G01S 13/58; G01S 13/867
See application file for complete search history.

(56) References Cited

U.S. PATENT DOCUMENTS

| | | | |
|---|---|---|---|
| 4,545,576 A | 10/1985 | Harris | |
| 4,915,384 A | 4/1990 | Bear | |
| 5,768,151 A | 6/1998 | Lowy et al. | |
| 6,133,946 A | 10/2000 | Cavallaro et al. | |
| 6,634,967 B2 | 10/2003 | Daniel | |
| 7,324,663 B2 | 1/2008 | Kiraly | |
| 7,341,530 B2 | 3/2008 | Cavallaro et al. | |
| 2006/0008116 A1* | 1/2006 | Kiraly | G06T 7/0018 382/103 |
| 2008/0219509 A1* | 9/2008 | White | A63B 24/0003 382/107 |
| 2009/0075744 A1 | 3/2009 | Tuxen | |
| 2012/0033855 A1* | 2/2012 | Ryan | G06T 7/20 382/103 |
| 2013/0218308 A1 | 8/2013 | Altshuler et al. | |
| 2014/0300745 A1* | 10/2014 | Kirk | H04N 7/18 348/158 |
| 2015/0373306 A1* | 12/2015 | Flores | H04N 5/77 348/157 |
| 2016/0180544 A1* | 6/2016 | Hohteri | G06T 7/2033 348/157 |
| 2016/0306036 A1* | 10/2016 | Johnson | G01S 13/68 |
| 2016/0307335 A1* | 10/2016 | Perry | G06T 7/2093 |
| 2016/0320476 A1* | 11/2016 | Johnson | G06T 7/80 |

* cited by examiner

*Primary Examiner* — Oneal R Mistry

(74) *Attorney, Agent, or Firm* — Maschoff Brennan

(57) ABSTRACT

According to some embodiments, the present disclosure may relate to a method including transmitting a microwave towards a moving object and receiving a reflection of the microwave reflecting off of the moving object. The method may also include determining a speed of the moving object based on the reflection of the microwave and based on the speed of the moving object and a flight path distance of the moving object, determining an optimal photograph timeframe when the moving object is in a field of view of a camera. The method may further include automatically capturing a plurality of images during the optimal photograph timeframe.

20 Claims, 9 Drawing Sheets

SYSTEMS AND METHODS OF ANALYZING MOVING OBJECTS

FIELD

The embodiments discussed herein are related to systems and methods of analyzing moving objects.

BACKGROUND

In various circumstances, it may be desirable to analyze various flight characteristics of moving objects. One such circumstance includes sports where moving objects may be part of the sport, such as a baseball, a golf ball, a tennis ball, a hockey puck, a cricket ball, or the like.

The subject matter claimed herein is not limited to embodiments that solve any disadvantages or that operate only in environments such as those described above. Rather, this background is only provided to illustrate one example technology area where some embodiments described herein may be practiced.

SUMMARY

One embodiment of the present disclosure may include a method including transmitting a microwave towards a moving object and receiving a reflection of the microwave reflecting off of the moving object. The method may also include determining a speed of the moving object based on the reflection of the microwave and based on the speed of the moving object and a flight path distance of the moving object, determining an optimal photograph timeframe when the moving object is in a field of view of a camera. The method may further include automatically capturing a plurality of images during the optimal photograph timeframe.

Another embodiment of the present disclosure may include a system including a radar device including a transmitter for transmitting a microwave towards a moving object and a receiver for receiving a reflection of the microwave reflecting off of the moving object. The system may also include a camera, a memory, and a processor communicatively coupled to the memory and configured to read instructions stored on the memory causing the processor to perform operations. The operations may include determining a speed of the moving object based on the reflection of the microwave, based on the speed of the moving object and a known flight path distance of the moving object, determining an optimal photograph timeframe, and automatically triggering the camera to capture a plurality of images during the optimal photograph timeframe.

Another embodiment of the present disclosure may include a method of estimating a flight trajectory of a moving object. The method may include triggering a single camera to capture a plurality of images of the moving object while the moving object is in a field of view of the single camera and extrapolating the flight trajectory of the moving object based on the plurality of images. The method may also include measuring a speed of the moving object using a radar device and verifying the flight trajectory of the moving object based on the speed measured by the radar device.

The object and advantages of the embodiments will be realized and achieved at least by the elements, features, and combinations particularly pointed out in the claims.

Both the foregoing general description and the following detailed description provide examples and are explanatory and are not restrictive.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described herein relate to determining characteristics of a moving object using radar and a camera system. An initial radar reading may be taken, and the radar reading may be used to determine an optimal time to capture images of the moving object. Based on the optimal time, a camera may automatically capture a plurality of images of the moving object. Using the captured images, flight characteristics of the moving object may be extrapolated, for example, speed, velocity, rotation, axis of rotation, speed of rotation, vertical angle of elevation, azimuth angle, trajectory, release angle, etc. The flight characteristics may be used to further characterize the flight of the moving object. For example, if the moving object is a baseball, the flight characteristics may be used to characterize the type of pitch (e.g. a fastball, curveball, slider, or breaking ball) or location of pitch (e.g. strike or ball).

Rather than solving a routine problem using routine computer algorithms, some embodiments of the present disclosure may relate to using particular hardware components, such as radar devices and cameras controlled by one or more processors, to address specific problems associated with analyzing moving objects, such as baseballs, tennis balls, golf balls, cricket balls, etc.

Embodiments of the present disclosure are explained with reference to the accompanying drawings.

Figure 1:
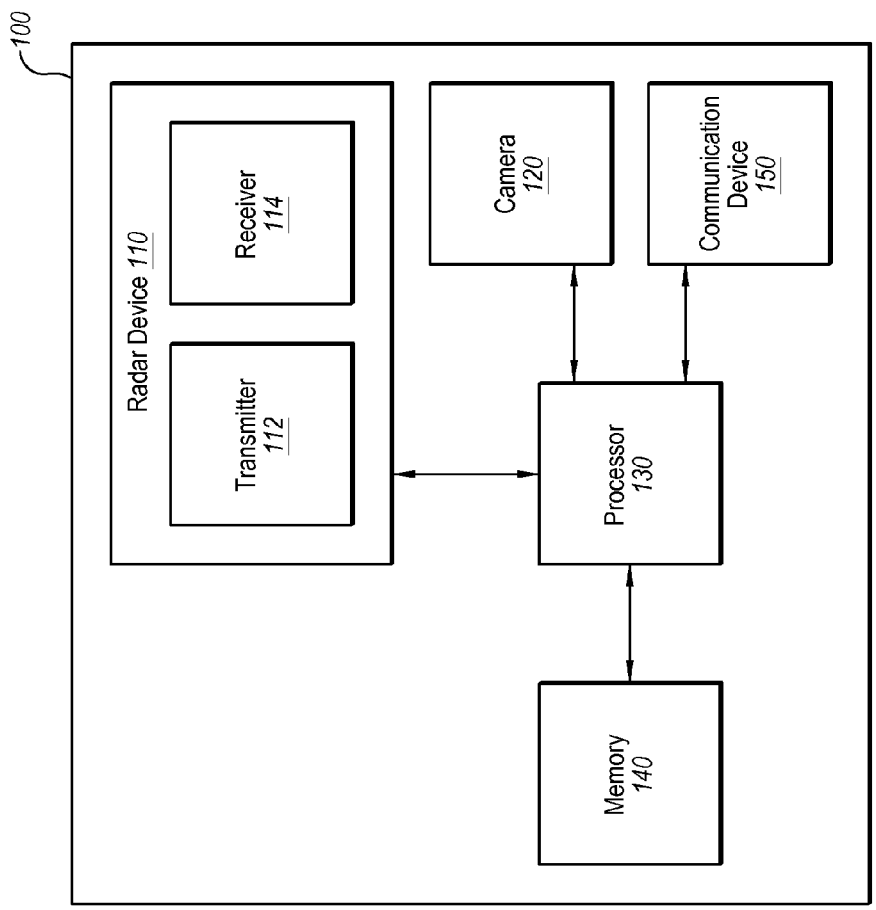
FIG. 1 illustrates an example system for analyzing a moving object, in accordance with some embodiments of the present disclosure.

FIG. 1 illustrates an example system 100 for analyzing a moving object, in accordance with some embodiments of the present disclosure. The system 100 may include a radar device 110, a camera 120, a processor 130, a memory 140, and a communication device 150. The operation of the system 100 may be controlled by the processor 130, and the processor 130 may be in communication with each of the other components of the system 100. The components of the system 100 may work cooperatively using one or both of radar readings from the radar device 110 and images captured by the camera 120 to analyze the flight of a moving object. While all components of the system 100 are shown in communication with the processor 130 but not in communication with each other, it will be appreciated that any of the other components may also be in communication with each other. For example, the radar device 110 may be in communication with the camera 120 and the camera 120 may be in communication with the memory 140 and the communication device 150, etc. Additionally, while the system 100 is shown as a unitary device, it will be appreciated that one or more of the components may be distributed or may span across multiple devices.

The radar device 110 may include any system, component, or series of components configured to transmit one or more microwaves or other electromagnetic waves towards a moving object and receive a reflection of the transmitted microwaves back, reflected off of the moving object. The radar device 110 may include a transmitter 112 and a receiver 114. The transmitter 112 may transmit a microwave through an antenna towards the moving object. The receiver 114 may receive the microwave reflected back from the moving object. The radar device 110 may operate based on techniques of Pulsed Doppler, Continuous Wave Doppler, Frequency Shift Key Radar, Frequency Modulated Continuous Wave Radar, or other radar techniques as known in the art. The frequency shift of the reflected microwave may be measured to derive a radial velocity of the moving object, or in other words, to measure the speed at which the moving object is traveling towards the radar device 110. The radial velocity may be used to estimate the speed of the moving object.

The radar device 110 may also include any of a variety of signal processing or conditioning components. For example, the radar device 110 may include an analog front end amplifier and/or filters to increase the signal to noise ratio by amplifying and/or filtering out high frequencies or low frequencies, depending on the moving object and the context in which the radar device 110 is being used. In some embodiments, the signal processing or conditioning components may separate out low and high frequencies and may amplify and/or filter the high frequencies separately and independently from the low frequencies.

The camera 120 of the system 100 may include any device, system, component, or collection of components configured to capture images. The camera 120 may include optical elements such as, for example, lenses, filters, holograms, splitters, etc., and an image sensor upon which an image may be recorded. Such an image sensor may include any device that converts an image represented by incident light into an electronic signal. The image sensor may include a plurality of pixel elements, which may be arranged in a pixel array (e.g., a grid of pixel elements). For example, the image sensor may comprise a charge-coupled device (CCD) or complementary metal-oxide-semiconductor (CMOS) image sensor. The pixel array may include a two-dimensional array with an aspect ratio of 1:1, 4:3, 5:4, 3:2, 16:9, 10:7, 6:5, 9:4, 17:6, etc., or any other ratio. The image sensor may be optically aligned with various optical elements that focus light onto the pixel array, for example, a lens. Any number of pixels may be included such as, for example, eight megapixels, fifteen megapixels, twenty megapixels, fifty megapixels, one hundred megapixels, two hundred megapixels, five hundred megapixels, one thousand megapixels, etc.

The camera 120 may operate at certain frame-rates, or be able to capture a certain number of images in a given time. The camera 120 may operate at a frame rate of greater than or equal to about sixty frames per second, for example between about one hundred and about three hundred frames per second. In some embodiments, a smaller subset of the available pixels in the pixel array may be utilized to allow for the camera 120 to operate at a higher frame rate. For example, if the moving object is known or estimated to be located in a certain quadrant, region, or space of the pixel array, only that quadrant, region, or space may be utilized in capturing the image allowing for a faster refresh rate to capture another image. Using less than the entire pixel array may allow for the use of less-expensive cameras while still enjoying a higher effective frame rate.

Various other components may also be included in the camera 120. Such components may include one or more illuminating features such as a flash or other light source, a light diffuser, or other components for illuminating an object. In some embodiments, the illuminating features may be configured to illuminate the moving object when it is proximate the image sensor, for example, when the moving object is within three meters of the image sensor. In some embodiments, a single camera may be used.

Any number of a variety of triggers may be used to cause the camera 120 to capture one or more images of the moving object. By way of non-limiting examples, the camera may be triggered when the moving object is known or estimated to be in the field of view of the camera 120, when a moving object first begins or modifies its flight (for example when a baseball is pitched, when a baseball is batted, when a golf ball is struck, when a tennis ball is served, when a cricket ball is bowled, etc.), when a moving object is detected at a leading row of pixels in the pixel array, etc. Another example of a trigger may be a persisting peak in a spectrum of reflected microwaves. For example, if there is consistently a peak at a given frequency known to be in an expected moving object frequency for a given duration of time, this may act as a triggering event.

In some embodiments, the camera 120 may have a field of view in which images may be captured. The field of view may correspond to the pixel array. In some embodiments, the field of view may be limited such that the moving object only spends a limited amount of time within the field of view. In such embodiments, the camera 120 may be triggered to capture images while the moving object is within the field of view. The time in which the moving object is within the field of view of the camera 120 may be referred to as an optimal photograph timeframe. In some embodiments, the optimal photograph timeframe may include when only the entire moving object is within the field of view or may include when only a portion of the moving object is within the field of view. Other factors may also contribute to the optimal photograph timeframe, such as the distance between the image sensor and the moving object, the amount of illumination that may be provided by an illuminating feature, etc. For example, the optimal photograph timeframe may occur when the moving object is traveling between three meters and one meter away from the camera 120 as that may be where a flash of the camera 120 provides illumination of the moving object.

The processor 130 may include any suitable special-purpose or general-purpose computer, computing entity, or processing device including various computer hardware or software modules and may be configured to execute instructions stored on any applicable computer-readable storage media. For example, the processor 130 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 1, the processor 130 may include any number of processors configured to perform, individually or collectively, any number of operations described in the present disclosure. Additionally, one or more of the processors may be present on one or more different electronic devices, such as different devices physically coupled together or communicating remotely. By way of example, one or more of the processors being in different devices may include a processing sub-component associated with one or more of the radar device 110, the camera 120, the communication device 150, or any other device coupled to or associated with the system 100, working with a processor in another device such as a remote display device or a remote computing device configured to perform one or more of the operations described in the present disclosure.

In some embodiments, the processor 130 may interpret and/or execute program instructions and/or process data stored in the memory 140. In some embodiments, the processor 130 may fetch program instructions from a data storage and load the program instructions in the memory 140. After the program instructions are loaded into memory 140, the processor 130 may execute the program instructions. In some embodiments, the execution of instructions by the processor 130 may direct and/or control the operation of the device 100. For example, the processor 130 may instruct the camera 120 to capture images at certain times, for example, during the optimal photograph timeframe.

In some embodiments, the processor 130 may utilize the received microwave signal from the radar device 110 to determine the radial velocity of the moving object. The processor 130 may perform spectral measurement on the Doppler signal to determine whether there is a moving object. For example, using the example of a pitched baseball, the spectral measurements may be used to determine if there is an object reflecting the microwaves travelling between forty and one hundred miles per hour. The spectral measurements may include performing a Fast Fourier Transform (FFT) to determine whether any of the frequency peaks cross a particular threshold. The processor 130 may then use that peak to determine the radial velocity of the moving object.

The processor 130 may use the determined radial velocity as one factor to trigger the camera 120 capturing images of the moving object. For example, a flight path distance may be estimated between an initial point of the moving object and the system 100. In some embodiments, the flight path distance may be estimated as the distance between the initial point of the moving object and the field of view of the camera 120. For example, if the moving object is a baseball, the estimated flight path distance may be the distance between the pitcher's mound and home plate. The processor 130 may then determine the amount of time required for the moving object to traverse the flight path distance and arrive at the field of view of the camera 120 or until the optimal photograph timeframe. The processor 130 may also account for any time required for the camera 120 to actually capture the image.

In some embodiments, the processor 130 may determine the number of images to be captured. The number of images to be captured may be based on an input from a user, a default setting, the context of the moving object, or selected based on the field of view of the camera 120 and the speed of the moving object. A larger number of images may allow for a more accurate extrapolation of flight characteristics. In some embodiments, a default setting may include capturing two, three, or four images. The processor 130 may be configured to trigger the camera 120 to capture images of the moving object during the optimal photograph timeframe such that the desired number of images may be captured during the optimal photograph timeframe. For example, the processor 130 may determine that two images are desired and may wait until the entire moving object is in the field of view and may then trigger the camera 120 to capture two successive images as quickly as possible with the camera 120 with the first image only using one quadrant of the image sensor of the camera 120 and the second image only using a different quadrant of the image sensor of the camera 120.

The processor 130 may be configured to perform processing of the captured images or may utilize the communication device 150 to transmit the images to another device to perform processing of the captured images. Processing of the captured images may include extrapolating flight characteristics of the moving object. For example, the processor 130 may determine speed, velocity, rotation, axis of rotation, speed of rotation, vertical angle of elevation, azimuth angle, trajectory, release angle, etc.

In some embodiments, the processor 130 may perform other characterizations of the moving object based on one or more of the flight characteristics. Using a pitched baseball as an example, the processor 130 may utilize the trajectory to determine whether the pitch is a ball or a strike. As another example, the pitch may be characterized as a fastball, breaking ball, slider, etc. based on the speed, rotation, trajectory, etc. of the baseball.

The processor 130 may compare the extrapolated flight characteristics to the data collected from the radar device 110. For example, an extrapolated trajectory may be compared to the actual radar values measured at one or more points in time. If there is a discrepancy between the radar values and the extrapolated trajectory, the processor 130 may include one or more environmental factors or atmospheric conditions to account for the discrepancy, such as humidity, wind, rain, etc. Alternatively, the processor 130 may verify the image quality of the captured images used to extrapolate the flight characteristics. For example, if any of the captured images are particularly fuzzy or grainy, the processor 130 may modify the extrapolated flight characteristics to conform more closely to the measured values from the radar device 110.

Other operations of the processor 130 with respect to the system 100 may be described with further reference to other figures in the present disclosure, described below.

The memory 140 may include computer-readable storage media for carrying or having computer-executable instructions or data structures stored thereon, including one or more of the images captured by the camera 120. Such computer-readable storage media may include any available media that may be accessed by a general-purpose or special-purpose computer, such as the processor 130. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 130 to perform a certain operation or group of operations. In some embodiments, memory 140, while depicted as a single component, may be multiple components. For example, memory 140 may be implemented as a combination of RAM, ROM, and flash memory.

The communication device 150 may be any component, device, or combination thereof configured to transmit or receive data. The communication device 150 may include, without limitation, a modem, a network card (wireless or wired), an infrared communication device, a wireless communication device (such as an antenna), and/or chipset (such as a Bluetooth device, an 802.6 device (e.g. Metropolitan Area Network (MAN)), a WiFi device, a WiMax device, cellular communication facilities, etc.), and/or the like. The communication device 120 may permit data to be exchanged with a network (such as, either alone or in any suitable combination, the Internet, an Intranet, a local Wi-Fi network, a wireless Local Area Network (LAN), a mobile network (e.g., a 3G, 4G, and/or LTE network), a LAN, a Wide Area Network (WAN), a MAN, a Bluetooth connection, or any other suitable communication network) and/or any other devices described herein, including remote devices.

Modifications, additions, or omissions may be made to the system 100 without departing from the scope of the present disclosure. For example, in some embodiments, the system 100 may include any number of other components that may not be explicitly illustrated or described. For example, in some embodiments the system 100 may include an accelerometer to measure an angle of the system 100 for use by the radar device 110 and/or the camera 120 to provide correct planar information for planar equalization. As another example, the system 100 may not include the communication device 150 and may perform all image processing locally at the system 100. The system 100 may also include a display for displaying any of the flight characteristics or other characterizations performed by the system 100.

Figure 2:
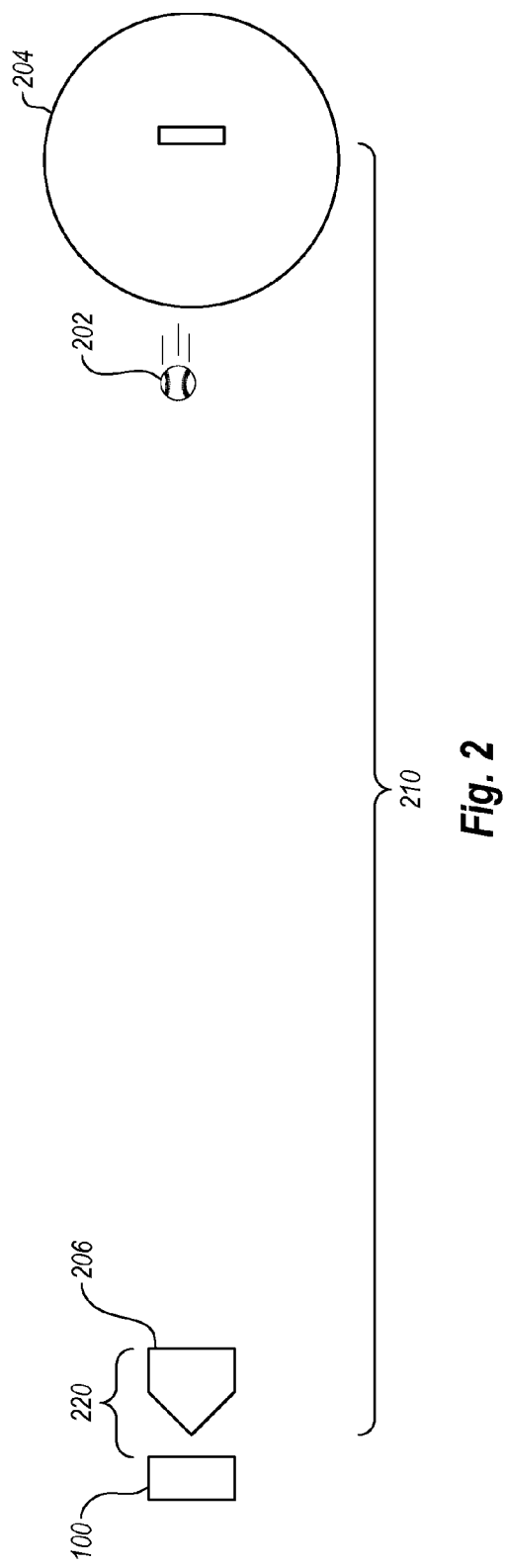
FIG. 2 illustrates a top down view of an example system for analyzing a moving object, in accordance with some embodiments of the present disclosure.

FIG. 2 illustrates a top down view of an example system for analyzing a moving object, in accordance with some embodiments of the present disclosure. FIGS. 2-8 use the example of a baseball 202 as the moving object, but the present disclosure is applicable to any other moving object, for example, other sporting paraphernalia such as a tennis ball, a golf ball, a hockey puck, a cricket ball, etc. The baseball 202 may be pitched from a pitching mound 204 along a flight distance 210 from the pitching mound 204 to the system 100. The system 100 may be located behind a home plate 206. For example, the system 100 may be between a catcher and the home plate 206 at a known distance 220. In some embodiments, the system 100 may be elevated a certain height behind the home plate 206 and angled down. In some embodiments, the system 100 may be to one side of the home plate 206 and angled towards the pitching mound 204. The system 100 may be located in any of a variety of locations such that the radar device and the camera may have the moving object in the field of view for a length of time sufficient to capture a plurality of images with the camera.

Figure 3:
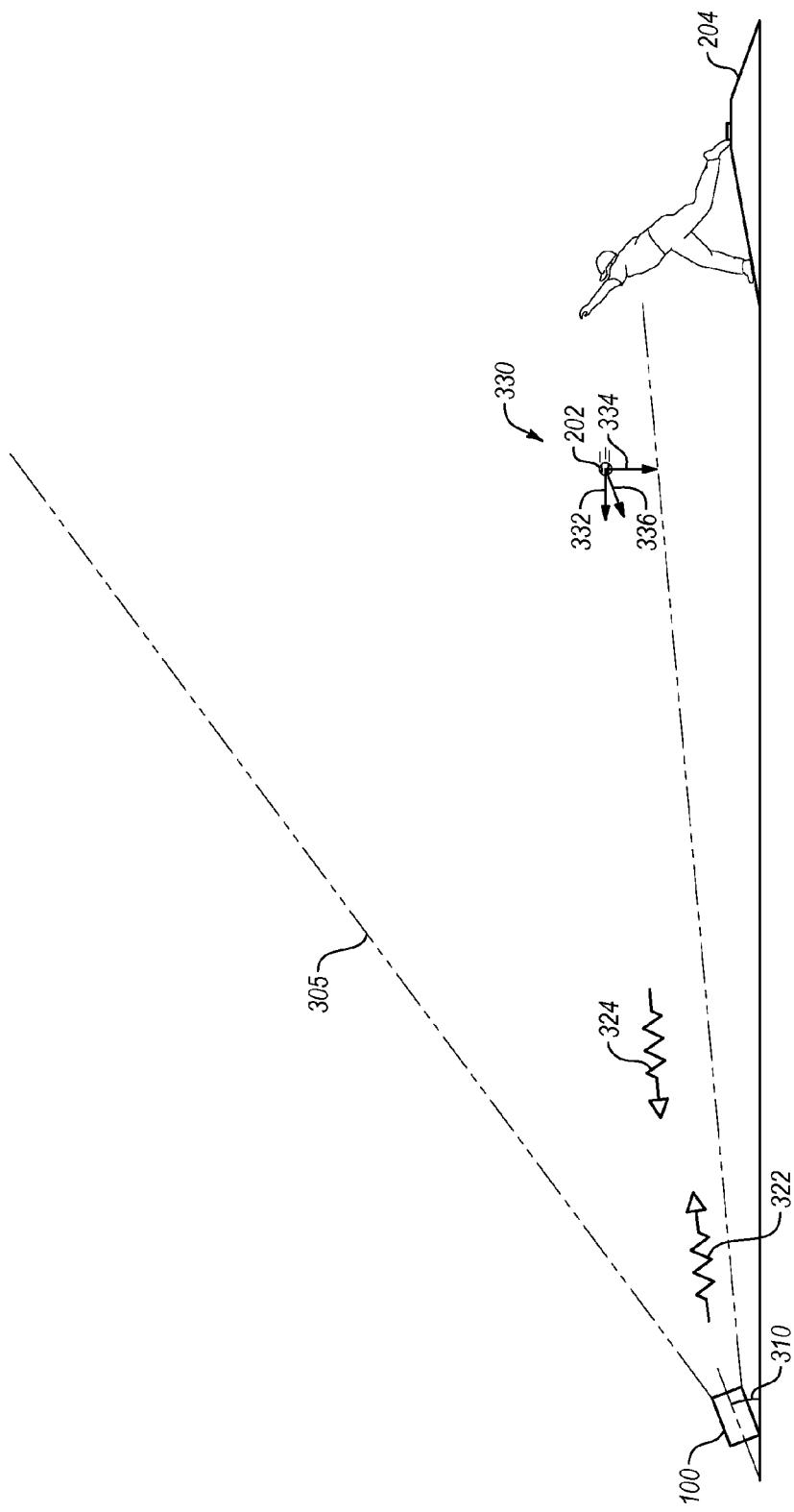
FIG. 3 illustrates a side view of an example system for analyzing a moving object, in accordance with some embodiments of the present disclosure.

FIG. 3 illustrates a side view of an example system for analyzing a moving object, for example, the system shown in FIG. 2. A baseball 202 may be pitched from pitching mound 204 towards home plate and also the system 100. The system 100 may be positioned at an angle 310 to increase a field of view 305 of a camera of the system 100. In some embodiments, the radar device and the camera of the system 100 may be tilted to the same plane. Angling the radar device and the camera to the same plane may facilitate easier manufacturing. In some embodiments, the radar device and the camera of the system 100 may be tilted to different planes.

When the baseball 202 is pitched, the system 100 may transmit microwaves 322 towards the baseball 202. In some embodiments, the system 100 may already be transmitting microwaves 322 in all directions with spatial distribution described by an antenna beam pattern of a radar device of the system 100. The transmitted microwave 322 may be reflected off of the baseball 202 and because of the relative velocity of the baseball 202, the reflected microwave 324 may have a different frequency than the transmitted microwave 322. The frequency drift may be referred to as Doppler frequency and may be a factor of the radial velocity 336. Additional details with respect to the determination of the radial velocity may be described with respect to FIG. 4.

The radar device of the system 100 may facilitate the determination of the radial velocity 336 of the baseball 202. For example, a vector diagram 330 may show a radial velocity 336 of the baseball 202. The baseball 202 may have component vectors 332 and 334 contributing to the radial velocity 336. In some embodiments, if the distance between the moving object (e.g. the baseball 202) is much larger than the distance above the ground of the moving object (e.g. the height of the baseball 202 above the ground), the radial velocity 336 may be estimated to be the same as the horizontal velocity 332 of the moving object. Stated another way, if the vertical velocity 334 of the radial velocity 336 is much smaller than the horizontal velocity 332, the radial velocity 336 may be estimated to be the same as the horizontal velocity 332. One example of the horizontal velocity 332 being much larger than the vertical velocity 334 may be if the horizontal velocity 332 is an order of magnitude larger than the vertical velocity 334. The assumption regarding the radial velocity 336 and the horizontal velocity 332 may also be particularly helpful for baseballs because a baseball that is not thrown at a relatively flat angle may result in a wild pitch.

Figure 4:
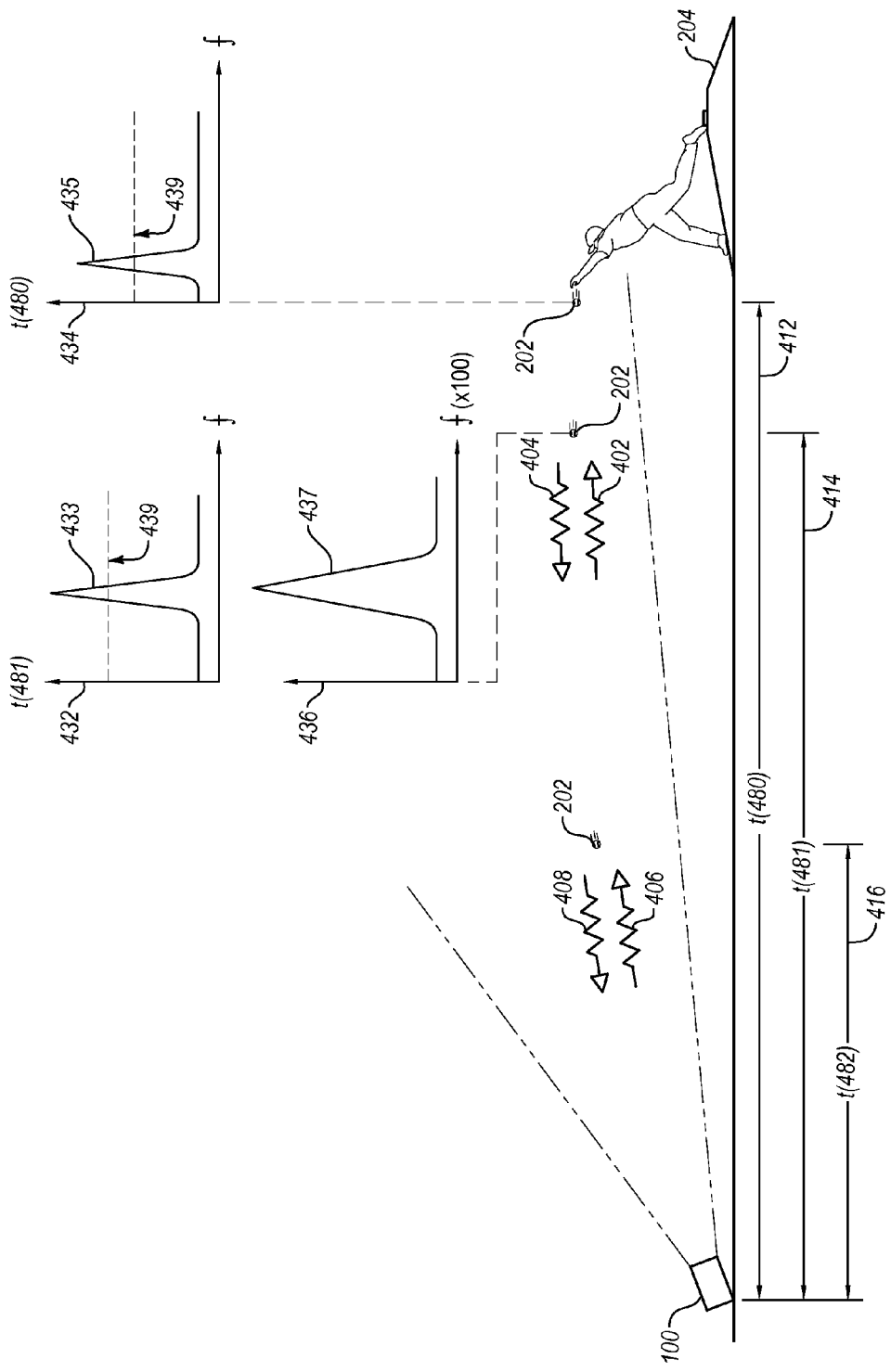
FIG. 4 illustrates a side view of an example operation of a radar device and a camera, in accordance with some embodiments of the present disclosure.

FIG. 4 illustrates a side view of an example operation of a radar device and a camera, in accordance with some embodiments of the present disclosure. FIG. 4 may illustrate an embodiment of determining the radial velocity. FIG. 4 illustrates a pitcher 420 who may pitch the baseball 202 towards the system 100. At time t(480), the pitcher may be initially releasing the baseball 202 and the baseball 202 may be an initial distance 412 from the system 100. At time t(481), the baseball 202 may have traveled further from the pitcher 420 such that the baseball is a first distance 414 from the system 100. At time t(482) the baseball 202 may have traveled even further from the pitcher 420 such that the baseball is a second distance 416 from the system 100. Similarly to the description with respect to FIG. 3, a first transmitted microwave 402 may be reflected off of the baseball 202 and the first reflected microwave 404 may have a different frequency, measured at time t(481). A second transmitted microwave 406 may be reflected off of the baseball 202 at time t(482) and the second reflected microwave 408 may have a different frequency from the second transmitted microwave 404.

In some embodiments, to determine the radial velocity, the first reflected microwave 404 signal may be filtered to remove carrier frequencies from the signal. The signal may be conditioned by an analog front end filter to filter out noise from the interested frequency band. A Fast Fourier Transform (FFT) may be performed on the signal to find the frequency content from the filtered and conditioned signal. An example FFT plot 432 may include a peak 433 indicative of the frequency associated with the baseball 202. In some embodiments, the peak 433 may be measured against a threshold 439 to determine if the peak 433 represents the desired moving object. In some embodiments, the radial velocity may be estimated based on the equation:

Doppler Frequency≈2*radial velocity*(transmitted frequency/speed of light)

Once the peak is found at a time t(481), a processor may look back at previous signals of reflected microwaves to determine if there is a similar peak that may have crossed a lower threshold a short time earlier (e.g. a few seconds like less than five seconds). The earlier velocity peak may represent the baseball 202 initially leaving the pitcher 420, for example, at t(480). In some embodiments, a joint time-frequency analysis may be performed to monitor linear changes in frequency over time so that the start of the frequency variation may be monitored. In some embodiments, if there is consistently a peak at a given frequency known to be in an expected ball speed frequency for a given duration of time, this may also indicate the baseball 202 being pitched.

In addition to monitoring the baseball 202, in some embodiments the first reflected microwave 404 signal may be duplicated or split and a secondary portion of the signal processed and filtered differently. For example, higher frequencies from the baseball 202 may be filtered out of the secondary portion to measure slower moving frequencies such as motion of the pitcher 420. However, because of the larger surface area of the pitcher 420 when compared to the baseball 202, a FFT plot 436 may experience a higher peak 437. For example, the signals from the pitcher 420 may be one or even several orders of magnitude larger than the signal from the baseball 202. By splitting or otherwise duplicating the signal from the reflected microwave 404, both the high frequency peak 433 and the low frequency peak 437 may be analyzed with a high degree of precision and with a high resolution. In some embodiments, the information regarding the motion of the pitcher 420 may be used as a trigger or as one of the factors of when to trigger the camera to capture images of the baseball 202.

When considering an FFT plot of the baseball 202 when at time t(482), further away from the pitcher 420 and at the distance 416 from the system 100, the FFT plot may have a peak at a lower frequency than when the baseball 202 is closer to the pitcher 420 and further away from the system 100, for example at time t(481) or t(480).

Figure 5:
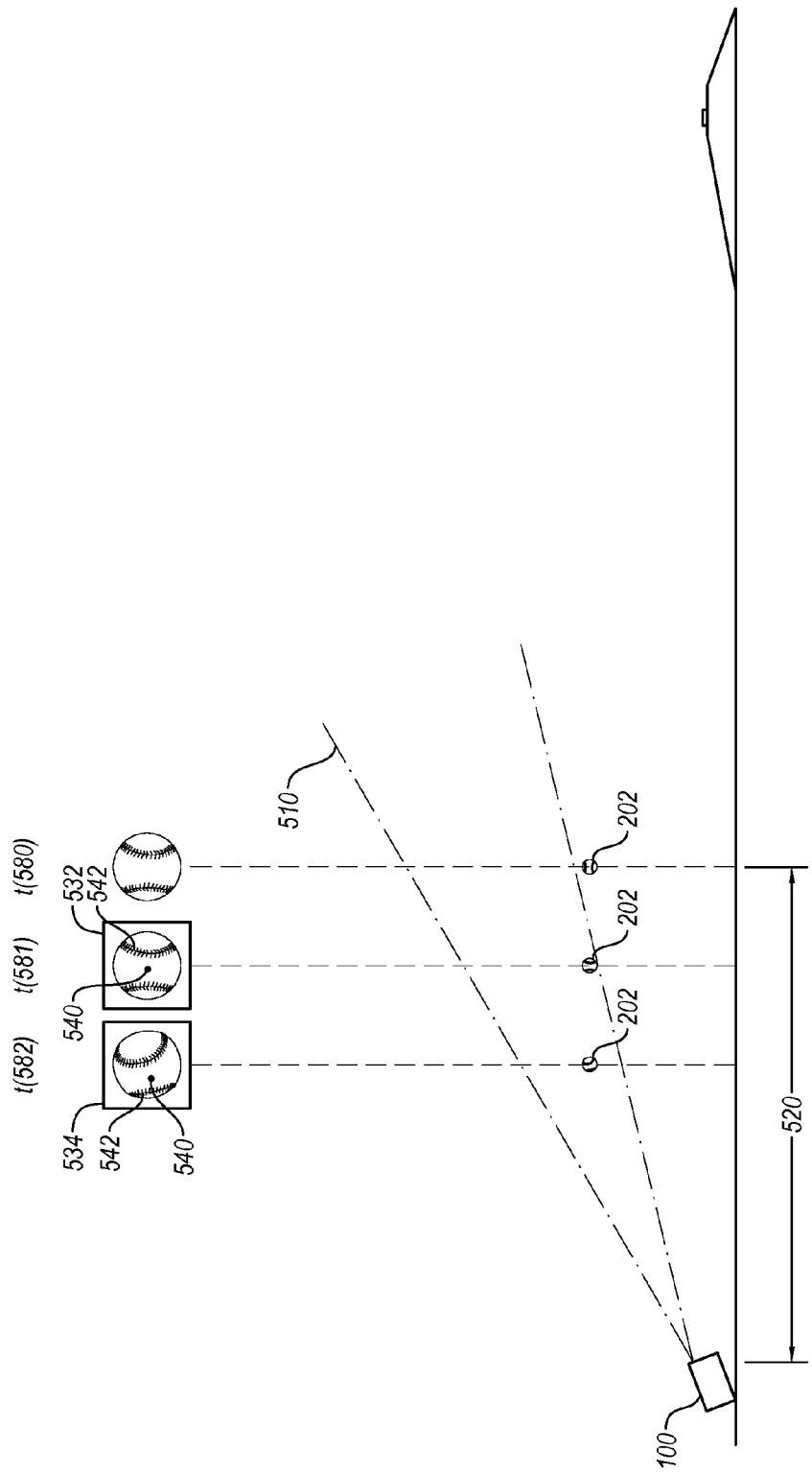
FIG. 5 illustrates a side view of an example operation of a camera, in accordance with some embodiments of the present disclosure.

FIG. 5 illustrates a side view of an example operation of a camera, in accordance with some embodiments of the present disclosure. As with FIGS. 2-4, the baseball 202 is pitched towards the system 100. At time t(580), the baseball 202 may not yet be within the field of view 510 of the camera of the system 100. A flash or other illuminating feature of the camera of the system 100 may illuminate the baseball in an illuminated region 520. Thus, the optimal photograph timeframe as shown in FIG. 5 may be the time in which the baseball 202 may be within the region 520 as well as in the field of view 510. The system 100 may determine when the optimal photograph timeframe is, and may trigger the camera to capture images during that timeframe, for example, at time t(581) capturing image 532 and at time t(582) capturing image 534.

In some embodiments, modulated radar may be used to determine the distance between the baseball 202 and the system 100. In such an embodiment, the system 100 may trigger the camera to capture images when the distance corresponding to times t(581) and t(582) are measured, triggering the camera to capture images 532 and 534 respectively.

The system 100 may use the images 532 and 534 for extrapolation of various flight characteristics. The extrapolation may include measuring size changes in the baseball 202 between the image 532 and the image 534. The extrapolation may include measuring the degree of rotation of the baseball 202 between the images 532 and 534. Measuring the degree of rotation may include selecting a reference point 540 and observing its location in the image 532 and the change in the reference point 540 in the image 534. A similar approach may be used for measuring the speed of rotation, as the time between images 532 and 534 may be known. Measuring the degree of rotation and/or the speed of rotation may also include selecting a feature of the baseball 202, such as the stitching 542 and comparing the location of the stitching 542 in the image 532 with the location of the stitching 542 in the image 534. In some embodiments, an outline of the stitching 542 may be traced and segmented to determine the orientation of the stitching 542 in each of the images 532 and 534. The system 100 may also determine an axis of rotation for the baseball 202. In some embodiments, perspective correction may be applied to equalize the effect of bias due to the baseball's position.

In some embodiments, one or more measurements of the radial speed of the baseball 202 may be used in the extrapolation of the flight characteristics or to verify, correct, or modify the flight characteristics. For example, an early or initial measurement of the radial speed taken by the radar device may be used to determine the size of the baseball 202 at t(581) and t(582) in the images 532 and 534 by using trajectory calculation and three-dimensional projection geometry. The three-dimensional points may be constructed by combining two-dimensional images and radar technology. In some embodiments, multiple radar receivers may be used to measure the direction vector of the baseball 202 at one or more points in time. These measurements may be compared with an extrapolated trajectory to verify the accuracy of the trajectory. In some embodiments, these measurements may be used as set points within the trajectory. In some embodiments, frequency modulated radar may be used to supplement or replace these measurements with range information at one or more points in time.

The flight characteristics may be used to further characterize the pitch of the baseball 202. For example, the pitch may be characterized as a fastball, curve ball, breaking ball, slider, etc. based on the speed, speed of rotation, angle of rotation, location, release angle, etc. The pitch may also be characterized as a strike or ball based on the flight characteristics. In some embodiments, the system 100 may employ a machine learning technique such that reference pitches may be thrown as one or more fastballs, one or more breaking balls, one or more sliders, etc. and the system 100 may then compare the flight characteristics of a given pitch with those stored characteristics and assign the given pitch a pitch type based on its similarity with one of the reference pitches. The system 100 may also take into account other elements such as pitcher release position, user input, etc. For example, given the height of the pitcher and the measured flight path, the height of the ball when released may be determined. The release height in conjunction with the pitcher height may yield a release angle (such as a side arm, overhead, or submarine pitch release angle). The release angle may be another factor utilized in determining the pitch characterization, for example, because an overhead slider may rotate at a different axis than a side arm slider.

While characterization of baseball pitches has been described, it will be appreciated that the same principles can be applied to other moving objects as well. One non-limiting example may include a golf ball trajectory being analyzed and the type of swing may be characterized as a hook, draw, fade, slice, etc. In such an example, the radar device and camera may be located behind the golfer facing a target of a golfer and may measure characteristics of the club and/or the golf ball. As another non-limiting example, a tennis serve may be characterized as a flat serve, a slice serve, a kick serve, a top-spin serve, etc. In such an example, the radar device and camera may be located slightly behind a server of a tennis ball or may be placed near the end of the court where the tennis ball is being served. As an additional example, a cricket ball may be analyzed during bowling or batting. In such an example, the radar device and the camera may be placed next to the stumps facing the bowler.

Figure 6:
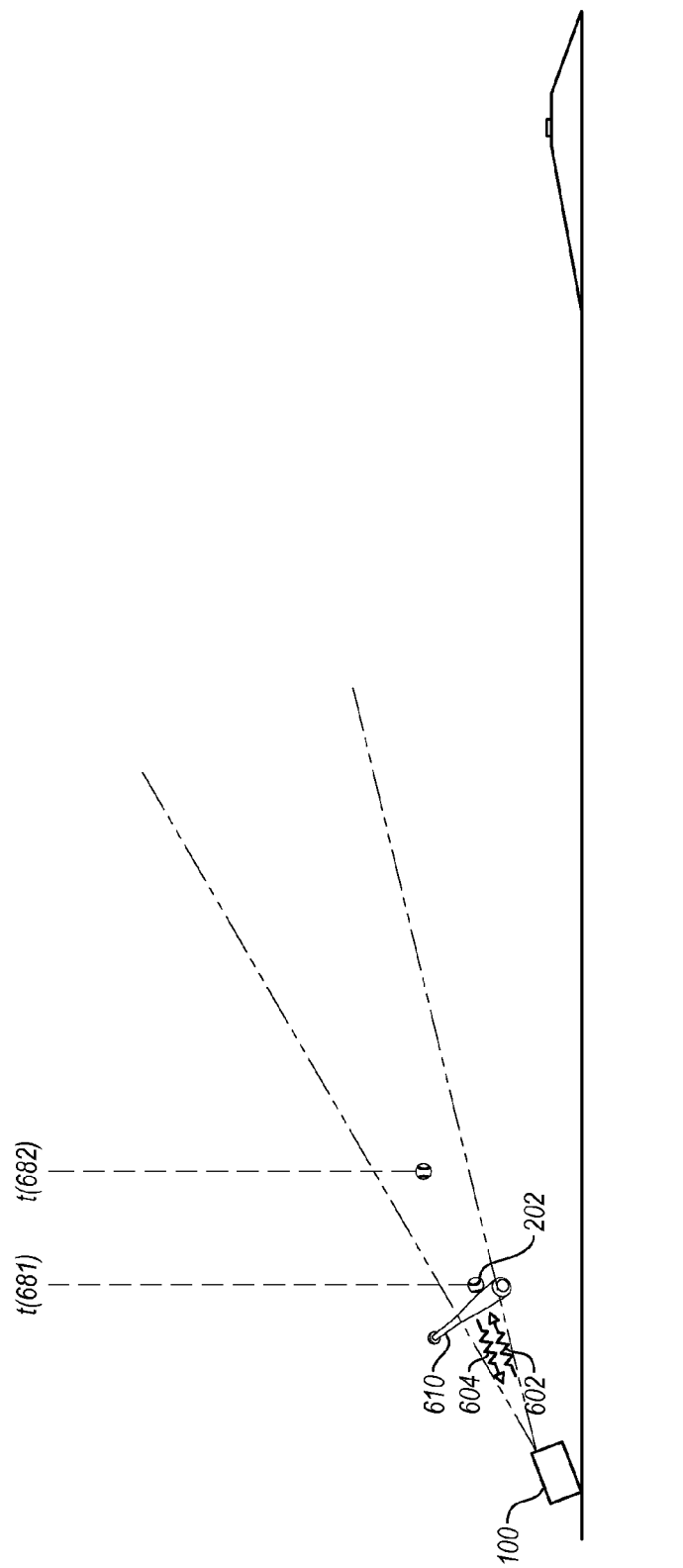
FIG. 6 illustrates an example system associated with a batter in accordance with some embodiments of the present disclosure.

FIG. 6 illustrates an example system associated with a batter in accordance with some embodiments of the present disclosure. As described with respect to FIG. 6, the system 100 may be used to determine flight characteristics of a batted ball, rather than a pitched ball. In some embodiments, the chain of action to capture images and determine flight characteristics may be triggered by a bat 610 being swung towards the ball 202. As described previously with respect to the pitcher's motion, transmitted microwaves 602 may reflect off of the bat 610 and the frequency shift in the reflected microwaves 604 may be indicative of the radial velocity of the bat. As with the pitcher's motion, the motion of the bat 610 may operate as a trigger for capturing images. In such an approach, the optimal photograph timeframe may be immediately after the bat 610 has contacted the baseball 202.

In some embodiments, the same approach of measuring the radial speed of the baseball 202 right after it is pitched may also be used as a trigger. Rather than capturing images of the baseball 202 as it arrives at the home plate, the system 100 may be configured to capture images a few moments later when the ball is being struck by the bat 610 or right after the baseball 202 has been struck.

In a manner similar to that described above with respect to pitched baseballs, the system 100 may capture an image at t(681) (for example, right after the baseball 202 is struck) and at t(682). The images captured may be used to extrapolate flight characteristics such as degree of rotation, speed, angle of rotation, trajectory, release angle, etc. In a manner similar to that described above with respect to pitched baseballs, radar readings of the speed of the baseball 202 at one or more points in time may be used to validate, correct, and/or modify any of the flight characteristics of the batted baseball 202. The images and/or radar readings may also provide bat swing speed, the swing plane, a landing spot of the baseball 202, etc. In some embodiments, a secondary camera may be used that may be tilted at a higher angle to have a more vertically oriented field of view or other wider field of view. In some embodiments only the secondary camera may be used.

Figure 7:
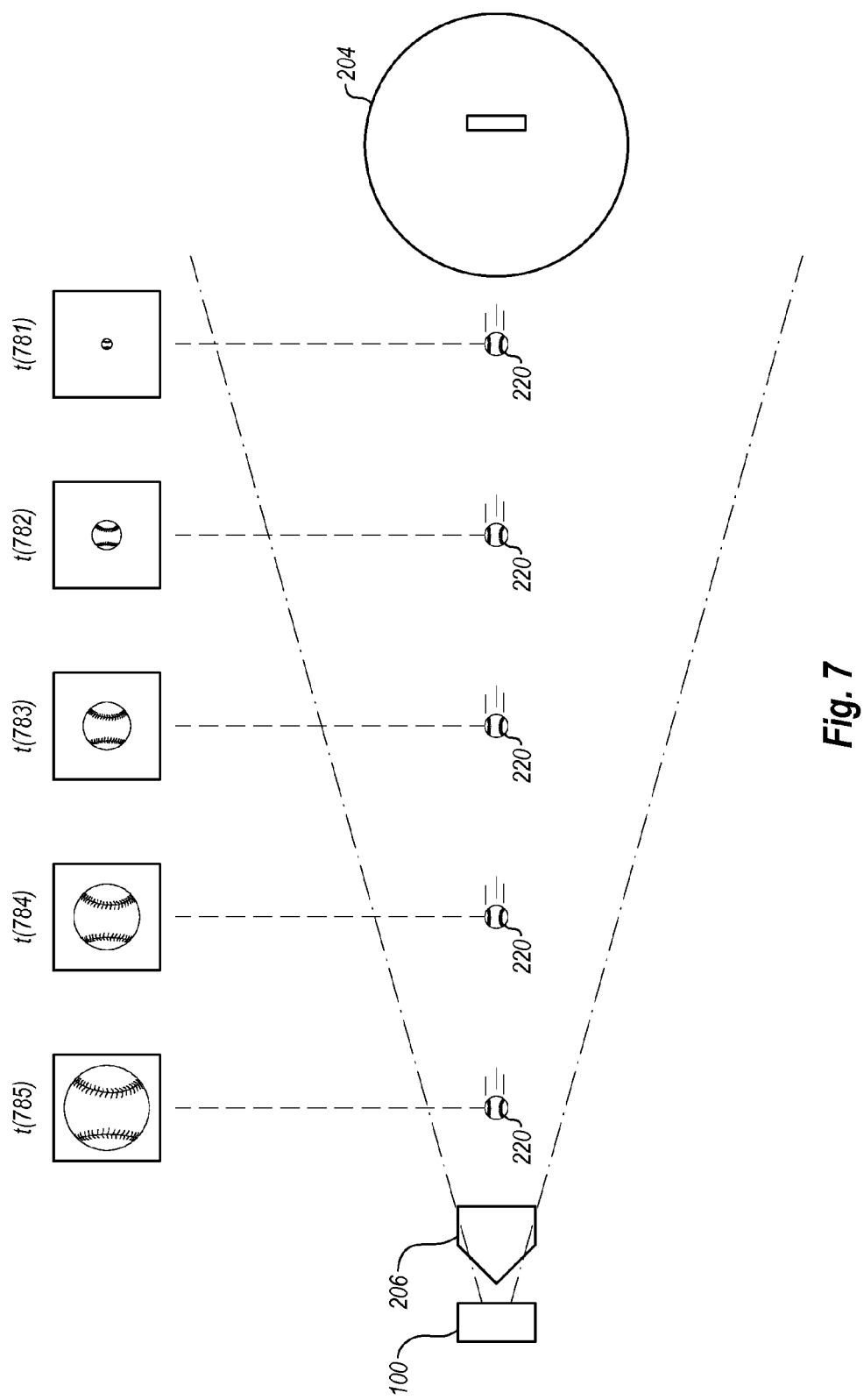
FIG. 7 illustrates an example plurality of images in accordance with some embodiments of the present disclosure.

FIG. 7 illustrates an example plurality of images in accordance with some embodiments of the present disclosure. As shown in FIG. 7, as the baseball 202 is pitched from the pitching mound 204 towards the home plate 206, the baseball 202 takes up more and more of the field of view of the camera of the system 100. The baseball 202 entering the field of view may be illustrated by the images at times t(781) through t(785). Because a larger and larger portion of the field of view is taken up by the baseball 202, sharper and clearer images may be captured leading to more accurate extrapolations of flight characteristics. By placing the system directly behind the home plate 206, the last few images proximate the system 100 may have the baseball 202 large in the field of view. Likewise, the baseball 202 may be closer to illuminating features directly connected to the camera of the system 100. Additionally, the trajectory of the baseball 202 may converge towards the strike zone near the home plate 206, regardless of the release point of the pitcher. The convergence of the trajectory of the baseball 202 may allow the image sensor of the camera of the system 100 to reduce the area of the sensor that must be monitored or captured. By placing the system 100 directly behind the home plate 206, other players in the field may not interfere with the system 100 because it may have a direct line of sight to the pitching mound 204. Additionally, because the system 100 is proximate the strike zone and may be capturing images of the baseball 202 passing through the strike zone, the characterization of a pitch as a ball or a strike may be more accurate. In some embodiments, the depth and vertical displacement of the baseball 202 may be resolved in the images by the size of the baseball 202 and the y-pixel displacement.

Figure 8:
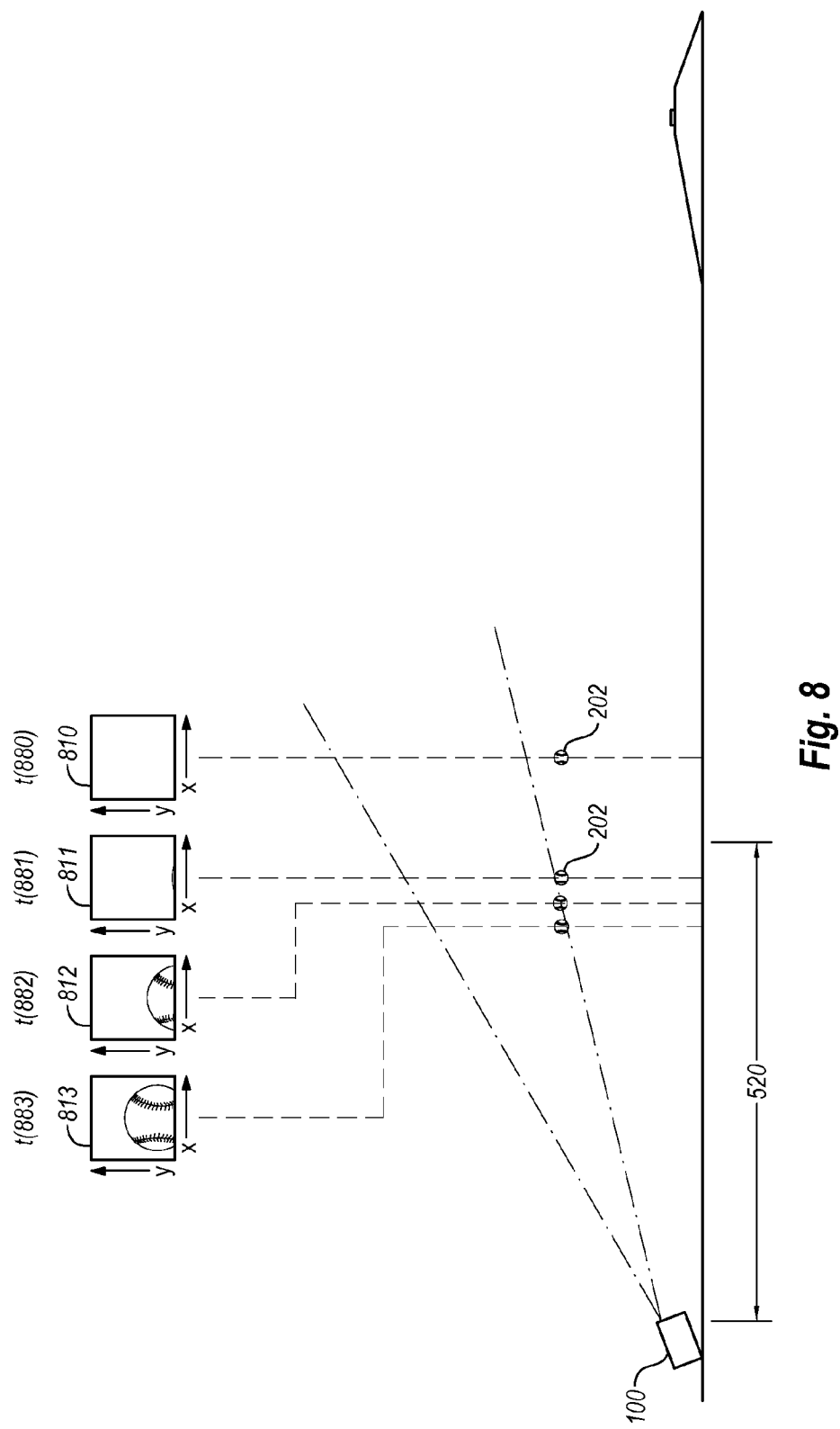
FIG. 8 illustrates an example triggering mechanism in accordance with some embodiments of the present disclosure.

FIG. 8 illustrates an example triggering mechanism in accordance with some embodiments of the present disclosure. At time t(881), a plot 810 illustrates the view on the image sensor of the camera of the system 100. Because the system 100 may be angled, the baseball 202 may enter the field of view from the bottom of the field of the view. For example, as seen in images 811, 812, and 813 at times t(881), t(882), and t(883), the baseball 202 may enter the field of view from the bottom until it is entirely within the field of view of the camera. Based on such an assumption, the processor of the system 100 may monitor the last row (or last several rows) of the pixel array of the image sensor to detect when the baseball 202 has entered the field of view of the camera. The last row or last several rows may be referred to as the leading edge of the pixel array. At time t(881) and shown on the plot 811, the baseball 202 may just begin entering the pixel array, and the baseball 202 appearing on the leading edge of the pixel array may cause the processor to trigger the camera to capture images of the baseball 202 within the optimal photograph timeframe. When determining when to trigger the camera, the processor may include the amount of time required to capture an image and may project how far the baseball 202 must travel to be completely within the field of view and may trigger the camera such that it may capture an image when the baseball 202 is within the field of view and within a region where the baseball 202 may be illuminated. In these and other embodiments, a radar device may or may not be part of the mechanism used to trigger the capture of images.

In some embodiments, a hybrid of triggering mechanisms may be used. For example, the speed measurement of the radar device initially detecting that the baseball 202 has been pitched may trigger the beginning of the scanning of the leading edge of the pixel array. The processor may still determine the optimal photograph timeframe, but may also wait until the pixel array has detected the presence of the baseball 202 before images are captured. In some embodiments, the speed reading from the radar device may trigger the scanning of the leading edge of the pixel array, and the presence of the baseball 202 within the pixel array may trigger the capturing of images. These examples are merely illustrative and in no way limiting. Any modifications, substitutions, or revisions to the triggering mechanism are contemplated within the scope of the present disclosure.

Figure 9:
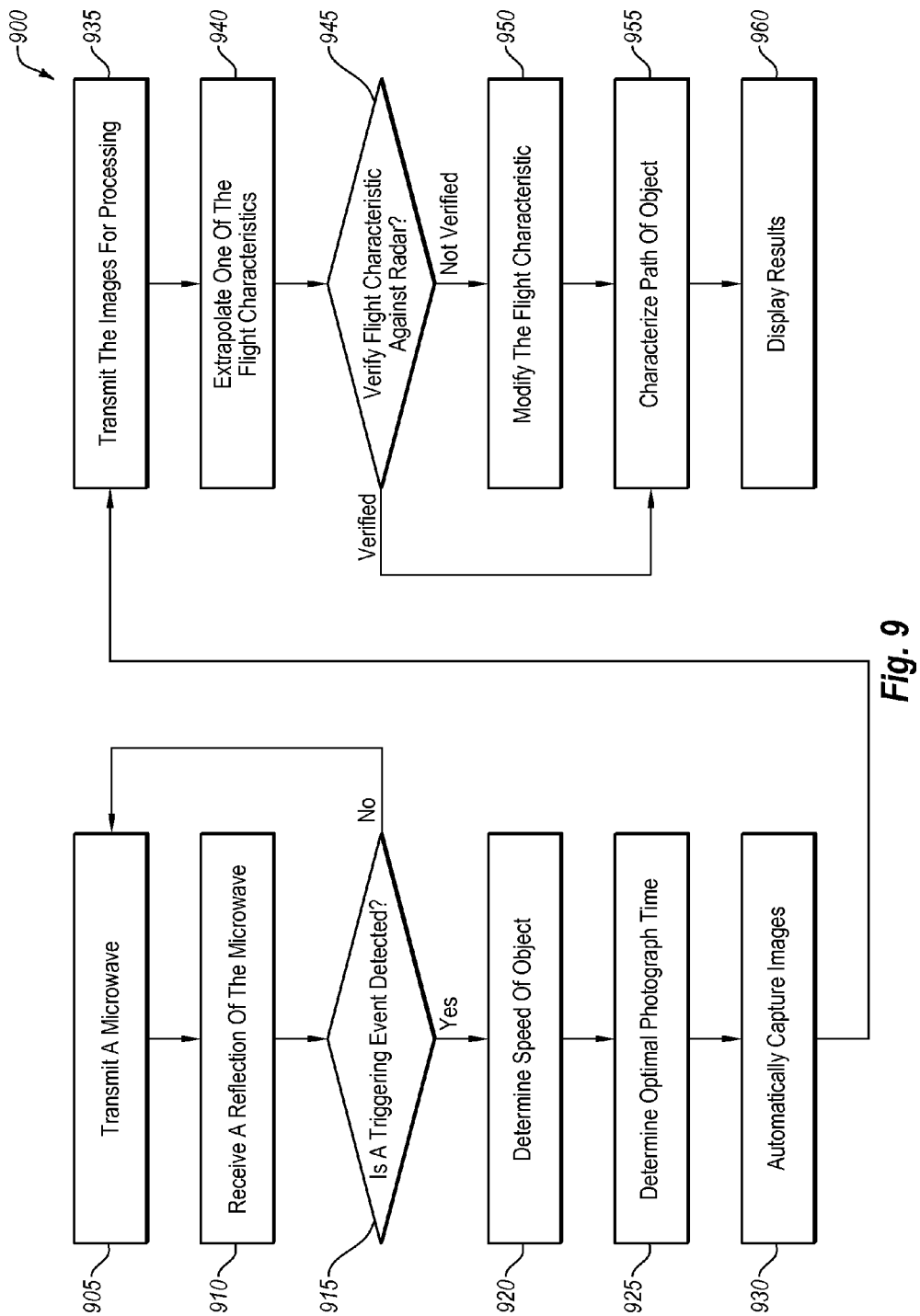
FIG. 9 illustrates a flowchart of an example method in accordance with some embodiments of the present disclosure.

FIG. 9 illustrates a flowchart of an example method 900 in accordance with some embodiments of the present disclosure. The method 900 may be performed by any suitable system, apparatus, or device. For example, the system 100 of FIG. 1 may perform one or more of the operations associated with the method 900. Although illustrated with discrete blocks, the steps and operations associated with one or more of the blocks of the method 900 may be divided into additional blocks, combined into fewer blocks, or eliminated, depending on the desired implementation.

At block 905, a microwave or other electromagnetic wave may be transmitted. The microwave may be transmitted towards a particular target such as a moving object or may be transmitted omni-directionally. The microwave may be transmitted by a radar device. For example, the radar device may be placed behind home plate and transmitted toward the baseball along the same or a similar path but in the opposite direction that the baseball is travelling. At block 910, a reflection of the transmitted microwave may be received by the radar device.

At block 915, a determination may be made as to whether a triggering even has occurred or not. The determination may include performing a FFT on the reflected microwave signal to determine if there is a peak of frequency shift that exceeds a threshold level. The peak may be based on a moving object or based on a person or object launching the moving object (for example, the peak may be based on a baseball or based on the pitcher's motion to pitch the baseball). If a triggering event has occurred, the method 900 may proceed to block 920. If no triggering event is detected, the method 900 may proceed back to block 905.

At block 920, a speed of the moving object may be determined. For example, using the frequency peak from a FFT and the frequency of the transmitted microwave, the radial velocity of the moving object may be determined. Determining the speed of the moving object may include certain assumptions (e.g., assuming the horizontal velocity component is much larger than the vertical velocity component of the radial velocity.

At block 925, the optimal photograph time may be determined. The optimal photograph time may be based on a flight distance from the beginning of the flight of the moving object to a camera. The optimal photograph time may also be based on the moving object being within a field of view of the camera and within a region illuminated by an illuminating feature. The optimal photograph time may also be based off of the moving object being detected on a pixel array of the camera.

At block 930, a plurality of images of the moving object may be automatically captured. The camera may be automatically triggered based on the optimal photograph time, the speed of the moving object, the moving object being detected in the field of view of the camera, etc.

At block 935, the images may be transmitted for processing. This may include transmitting the captured images to a remote device or to a different component within a system. For example, transmitting the images may include transmitting the images from the camera or a memory to the processor for analysis and/or processing.

At block 940, flight characteristics of the moving object may be extrapolated. Extrapolated flight characteristics may include speed, velocity, rotation, axis of rotation, speed of rotation, vertical angle of elevation, azimuth angle, trajectory, release angle, etc. In some embodiments, the extrapolation may be performed by a processor local to the camera. In other embodiments the extrapolation may be performed at a device remote from the camera.

At block 945 the extrapolated flight characteristics may be verified against the radial speed determined from the radar device. The speed used to verify the flight characteristics may include the speed determined at the block 920, or may include other speed determinations at other points in time using the radar device. If the flight characteristics are consistent with the speed, the method 900 may proceed to block 955. If the flight characteristics are not verified, the method may proceed to block 950.

At block 950, the flight characteristics may be modified to be more consistent with the speed measurements. The modifications may include accounting for environmental factors like rain, wind, humidity, etc. The modifications may also include revising the image analysis and considering the clarity of the captured images of the moving object. In some embodiments, the modifications of block 950 may be coextensive with the extrapolation of block 940. For example, speed readings may be used as set points when extrapolating the flight characteristics at block 940.

At block 955, the path of the moving object may be characterized in certain ways. For example, as described above, a pitched baseball may be characterized as a fast ball, a breaking ball, a curve ball, a slider, etc. and may further be characterized as a strike or a ball. As another example, a tennis serve may be characterized as a kick serve, as a flat serve, etc. As another example, a bowled ball in cricket may be characterized as a beamer, bouncer, inswinger, leg cutter, off cutter, outswinger, reverse swing, slower ball, yorker, arm ball, doosra, teesra, flipper, googly, carrom ball, leg spin, off spin, slider, topspinner, etc.

At block 960, various results of the method 900 may be displayed. This may include the characterization (e.g. a fastball strike), flight characteristics (e.g. the speed of the pitch, a visual depiction of the trajectory, a visual depiction of where the baseball crossed through strike zone), etc. The display may be done at a system including the camera, or may be at a remote device.

Accordingly, the method 900 may be used to analyze a moving object. Modifications, additions, or omissions may be made to the method 900 without departing from the scope of the present disclosure. For example, the operations of method 900 may be implemented in differing order. Additionally or alternatively, two or more operations may be performed at the same time. For example, the operation at blocks 940 and 950 may be performed simultaneously or cooperatively. As another example, blocks 905 and 910 may continue while the process proceeds. Furthermore, the outlined operations and actions are only provided as examples, and some of the operations and actions may be optional, combined into fewer operations and actions, or expanded into additional operations and actions without detracting from the essence of the disclosed embodiments. For example, operations at the blocks 925, 935, 945, 950, 955, and 960 may be removed from the method 900. All of the examples provided above are non-limiting and merely serve to illustrate the flexibility and breadth of the present disclosure.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," the term "containing" should be interpreted as "containing, but not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases at least one and one or more to introduce claim recitations. However, the use of such phrases should not be construed to imply that the introduction of a claim recitation by the indefinite articles "a" or an limits any particular claim containing such introduced claim recitation to embodiments containing only one such recitation, even when the same claim includes the introductory phrases one or more or at least one and indefinite articles such as "a" or an (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
   transmitting a microwave towards a moving object from a radar device;
   receiving a reflection of the microwave reflecting off of the moving object at the radar device;
   determining, by one or more processors, a speed of the moving object based on the reflection of the microwave;
   based on the speed of the moving object and a flight path distance of the moving object, determining, by the one or more processors, an optimal photograph timeframe when the moving object is in a field of view of a camera, wherein the flight path distance is a distance between an initial point of the moving object and the field of view of the camera, wherein the initial point of the moving point includes ball release area and the field of view of the camera includes a batting area; and
   automatically capturing a plurality of images during the optimal photograph timeframe by the camera triggered by the one or more processors.

2. The method of claim 1, further comprising using the plurality of images, extrapolating one or more flight characteristics of the moving object, the flight characteristics including speed, velocity, rotation, axis of rotation, speed of rotation, vertical angle of elevation, azimuth angle, trajectory, and release angle.

3. The method of claim 2, further comprising:
   verifying the one or more of the flight characteristics by comparing the extrapolation with the reflection of the microwave; and
   modifying the one or more of the flight characteristics in response to a determination that the extrapolation and the reflection of the microwave are different.

4. The method of claim 2, wherein the moving object is a baseball and the ball release area includes a pitcher's mound.

5. The method of claim 4, further comprising characterizing a pitch of the baseball as one of a fastball, a curve ball, a breaking ball, or a slider based on a direction of a rotation and a release angle of the baseball.

6. The method of claim 4, further comprising characterizing a pitch of the baseball as a ball or a strike based on a comparison of flight characteristics of the pitch of the baseball with a set of reference flight characteristics associated with a set of reference pitches.

7. The method of claim 4, wherein the camera is a single camera located behind home plate.

8. The method of claim 7, wherein the single camera is positioned at an angle, wherein the single camera comprises a sensor with a leading edge of pixels, wherein the processor is configured to monitor the leading edge of the pixels for the moving object entering a field of view of the single camera, wherein the leading edge includes one or more rows of pixels of the sensor.

9. The method of claim 8, wherein the moving object entering the field of view of the single camera triggers capturing of the plurality of images.

10. A system comprising:
    a radar device comprising:
    a transmitter for transmitting a microwave towards a moving object; and
    a receiver for receiving a reflection of the microwave reflecting off of the moving object;

a camera;
a memory; and
a processor communicatively coupled to the memory and configured to read instructions stored on the memory causing the processor to perform operations, the operations comprising:
   determining a speed of the moving object based on the reflection of the microwave;
   based on the speed of the moving object and a known flight path distance of the moving object, determining an optimal photograph timeframe, wherein the known flight path distance is a distance between an initial point of the moving object and the field of view of the camera, wherein the initial point of the moving point includes ball release area and the field of view of the camera includes a batting area;
   automatically triggering the camera to capture a plurality of images during the optimal photograph timeframe;
   extrapolating one or more flight characteristics of the moving object based on the plurality of images; and
   verifying the one or more flight characteristics by comparing the extrapolation with the reflection of the microwave.

11. The system of claim 10, wherein the flight characteristics including speed, velocity, rotation, axis of rotation, speed of rotation, vertical angle of elevation, azimuth angle, trajectory, and release angle.

12. The system of claim 11, the operations further comprising modifying the one or more of the flight characteristics in response to a determination that the extrapolation and the reflection of the microwave are different.

13. The system of claim 11, wherein the moving object is a baseball and the ball release area includes a pitcher's mound.

14. The system of claim 13, the operations further comprising characterizing a pitch of the baseball as one of a fastball, a curve ball, a breaking ball, or a slider based on a direction of a rotation and a release angle of the baseball.

15. The system of claim 13, the operations further comprising characterizing a pitch of the baseball as a ball or a strike based on a comparison of flight characteristics of the pitch of the baseball with a set of reference flight characteristics associated with a set of reference pitches.

16. The system of claim 10, wherein the camera is located proximate an end of the known flight path distance.

17. The system of claim 10, wherein the camera is positioned at an angle, wherein the camera comprises a sensor with a leading edge of pixels, wherein the processor is configured to monitor the leading edge of the pixels for the moving object entering a field of view of the camera, wherein the leading edge includes one or more rows of pixels of the sensor.

18. The system of claim 17, wherein the moving object entering the field of view of the camera triggers capturing of the plurality of images.

19. A method of estimating a flight trajectory of a moving object comprising:
   triggering a single camera to capture a plurality of images of the moving object while the moving object is in a field of view of the single camera and in between a ball release area and a batting area;
   extrapolating the flight trajectory of the moving object based on the plurality of images;
   measuring a speed of the moving object using a radar device; and
   verifying the flight trajectory of the moving object based on the speed measured by the radar device.

20. The method of claim 19, further comprising revising the flight trajectory of the moving object based on the speed measured using the radar device.

* * * * *